United States Patent

Nakajima et al.

Patent Number: 6,049,747
Date of Patent: Apr. 11, 2000

[54] DRIVER MONITORING DEVICE

[75] Inventors: Masato Nakajima, Tokyo; Kazuyuki Sasaki; Naoto Ishikawa, both of Shizuoka, all of Japan

[73] Assignee: Yazaki Corporation, Tokyo, Japan

[21] Appl. No.: 08/872,058

[22] Filed: Jun. 10, 1997

[30] Foreign Application Priority Data

Jun. 12, 1996 [JP] Japan .................................. 8-151143

[51] Int. Cl.⁷ .............................. B60R 21/00; H04N 7/18
[52] U.S. Cl. ................................ 701/45; 340/576; 348/77
[58] Field of Search ......................... 701/1, 45; 348/135, 348/136, 77; 340/576, 573.7; 382/203

[56] References Cited

U.S. PATENT DOCUMENTS

| | | | |
|---|---|---|---|
| 4,625,329 | 11/1986 | Ishikawa et al. | 382/104 |
| 5,293,427 | 3/1994 | Ueno et al. | 382/103 |
| 5,353,013 | 10/1994 | Estrada | 340/575 |
| 5,867,587 | 2/1999 | Aboutalib et al. | 382/117 |
| 5,878,156 | 3/1999 | Okumura | 382/118 |

FOREIGN PATENT DOCUMENTS 61-99803   5/1986   Japan .
2 284 582  6/1995   United Kingdom .

*Primary Examiner*—Michael J. Zanelli
*Attorney, Agent, or Firm*—Armstrong, Westerman, Hattori, McLeland & Naughton

[57] ABSTRACT

In a driver monitoring system, a pattern projecting device consisting of two fiber gratings stacked orthogonally which receive light from a light source projects a pattern of bright spots on a face of a driver. A image pick-up device picks up the pattern of bright spots to provide an image of the face. A data processing device processes the image, samples the driver's face to acquire three-dimensional position data at sampling points and processing the data thus acquired to provide inclinations of the face of the driver in vertical, horizontal and oblique directions. A decision device decides whether or not the driver is in a dangerous state in accordance with the inclinations of the face obtained. A warning device warns the driver against his dangerous state. The pattern light projecting device and pick-up device are integrated to each other and installed on a steering column on a vehicle. Thus, the driver monitoring system can assure performance, reliability and safety without hindering the driver in view of its installation on the vehicle.

9 Claims, 11 Drawing Sheets

DATA OF REFERENCE PLANE

DATA OF FACE

MOVING AMOUNT OF BRIGHT SPOTS

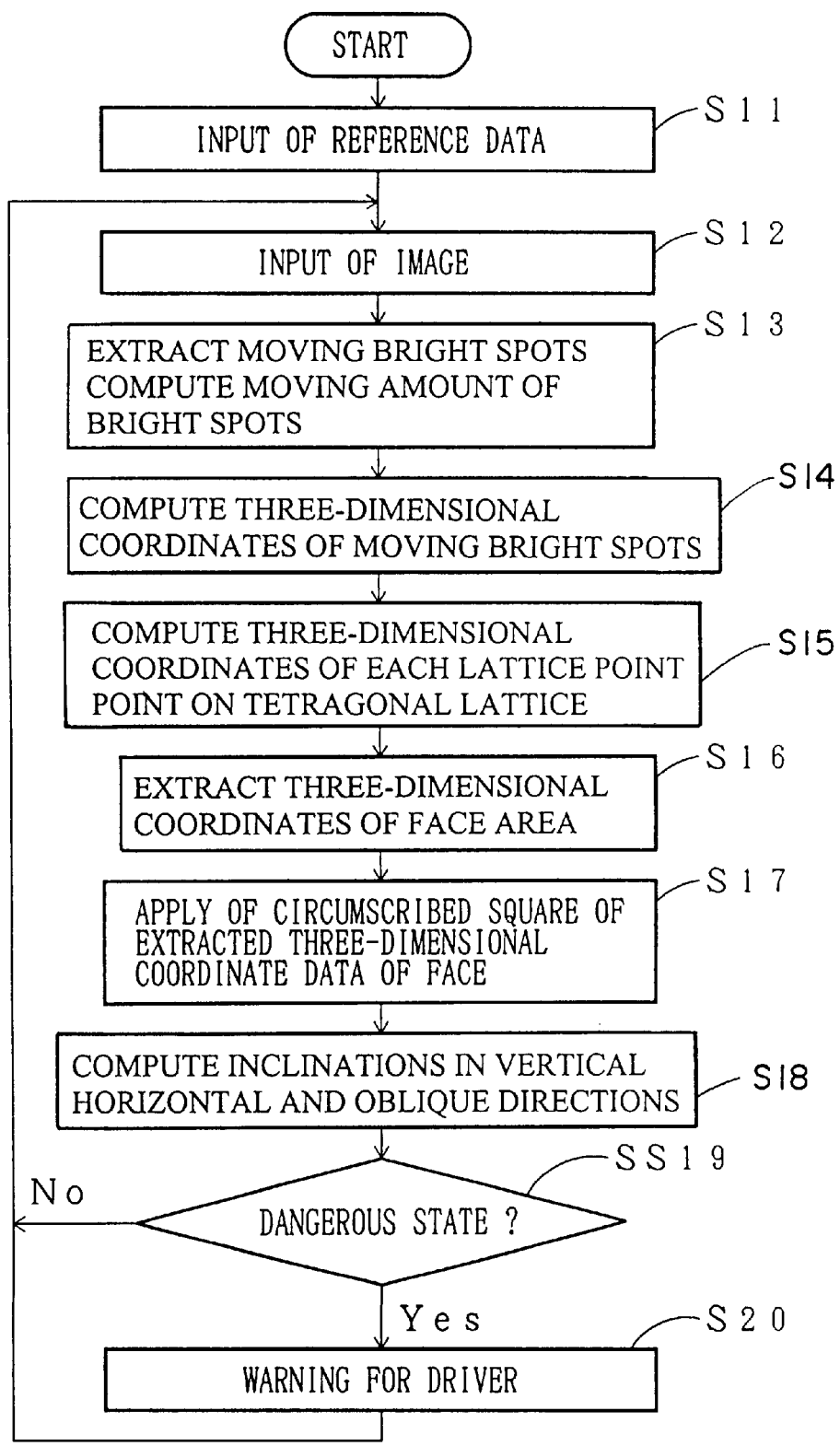

FIG. 12
| BRIGHT SPOTS No. | U | V |
|---|---|---|
| 1 | 1 0 1 | 5 0 |
| 2 | 1 1 0 | 6 0 |
| 3 | 1 2 0 | 5 0 |
| . | . | . |
| . | . | . |
| . | . | . |
| . | . | . |
| BACKGROUND 1 | . | . |
| 2 | . | . |
| 3 | . | . |
| 4 | . | . |
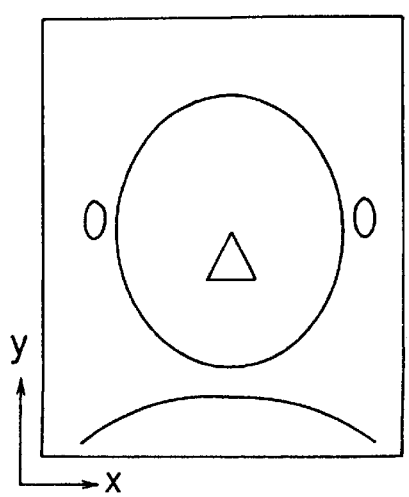
FIG. 17A
PORTION WITH LARGE INCLINATION NORMAL VECTOR
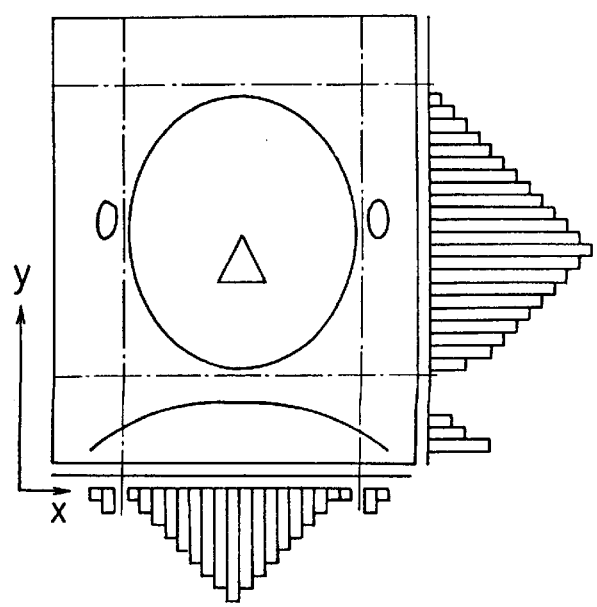
FIG. 17B
PROJECTION

| | | | | | | | | | | | | | | | | |
|---|---|---|---|---|---|---|---|---|---|---|---|---|---|---|---|---|
| 00 | 00 | 00 | 00 | 00 | 00 | 00 | 00 | 00 | 00 | 00 | 00 | 00 | 00 | 00 | 00 | |
| 00 | 00 | 00 | 00 | 00 | 00 | 00 | 00 | 00 | 00 | 00 | 00 | 00 | 00 | 00 | 00 | |
| 00 | 00 | 00 | 00 | 00 | 00 | 00 | 00 | 00 | 00 | 00 | 00 | 00 | 00 | 00 | 00 | |
| 00 | 00 | 00 | 00 | 00 | 00 | 00 | 00 | 00 | 00 | | | 80 | | 00 | 00 | |
| 00 | 00 | 00 | 00 | 00 | 00 | 00 | 00 | 00 | 00 | | 50 | 170 | 100 | 00 | 00 | |
| 00 | 00 | 00 | 00 | 00 | 00 | 00 | 00 | 00 | 00 | 115 | 150 | 190 | 50 | 00 | 00 | |
| 00 | 00 | 00 | 00 | 00 | 00 | 00 | 00 | 00 | 00 | 80 | 160 | 100 | 60 | 00 | 00 | |
| 00 | 00 | 00 | 00 | 00 | 00 | 00 | 00 | 00 | 00 | 110 | 100 | 130 | 40 | 00 | 00 | |
| 00 | 00 | 00 | 00 | 00 | 00 | 00 | 00 | 00 | 00 | 00 | 00 | 90 | | 00 | 00 | |
| 00 | 00 | 00 | 00 | 00 | 00 | 00 | 00 | 00 | 00 | 00 | 00 | 00 | 00 | 00 | 00 | |
| 00 | 00 | 00 | 00 | 00 | 00 | 00 | 00 | 00 | 00 | 00 | 00 | 00 | 00 | 00 | 00 | |
| 00 | 00 | 00 | 00 | 00 | 00 | 00 | 00 | 00 | 00 | 00 | 00 | 00 | 00 | 00 | 00 | |
| 00 | 00 | 00 | 00 | 00 | 00 | 00 | 00 | 00 | 00 | 00 | 00 | 00 | 00 | 00 | 00 | |
| 00 | 00 | 00 | 00 | 00 | 00 | 00 | 00 | 00 | 00 | 00 | 00 | 00 | 00 | 00 | 00 | |
| 00 | 00 | 00 | 00 | 00 | 00 | 00 | 00 | 00 | 00 | 00 | 00 | 00 | 00 | 00 | 00 | |

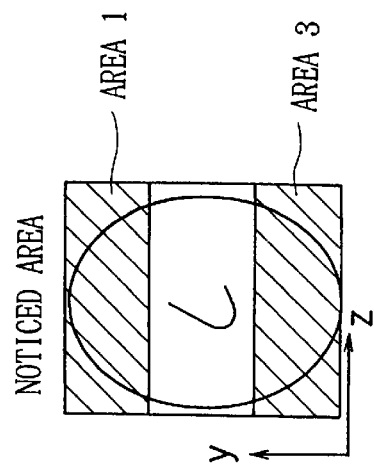
FIG.16A  MOVEMENT AROUND X-AXIS
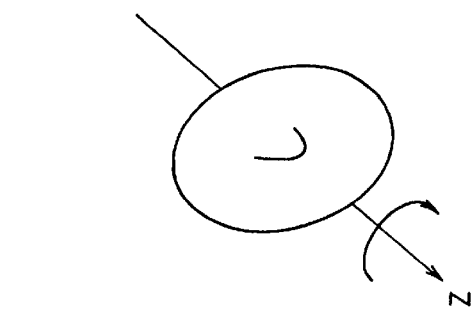
FIG.16B  MOVEMENT AROUND Y-AXIS
FIG.16C  MOVEMENT AROUND Z-AXIS
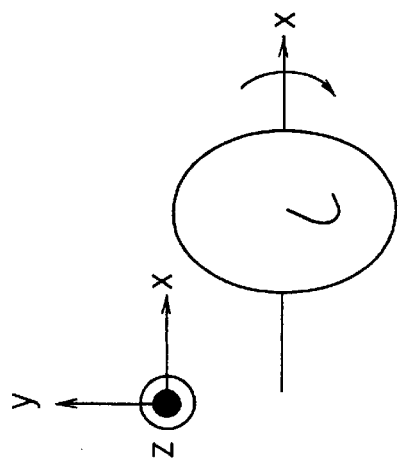
FIG.18
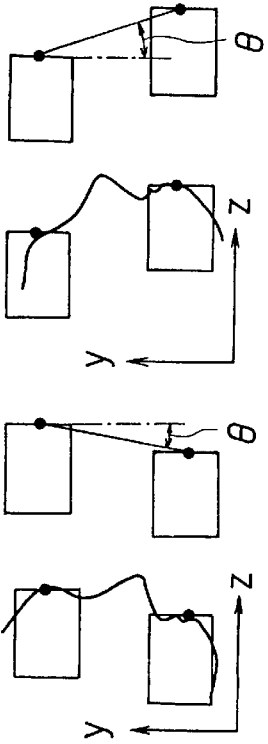
FIG.19A
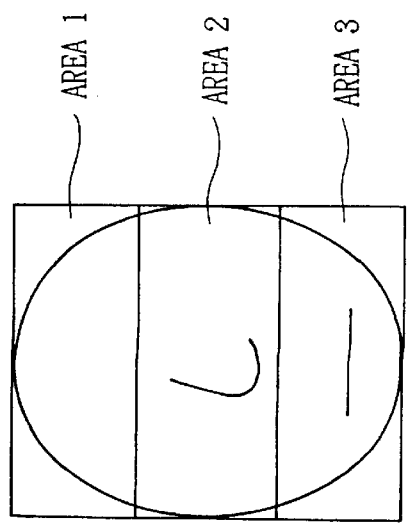
FIG.19B  DETERMINE OF CHANGE IN HEIGHT AND INCLINATION OF FACE FIG. 20A
VERTICAL PROJECTION
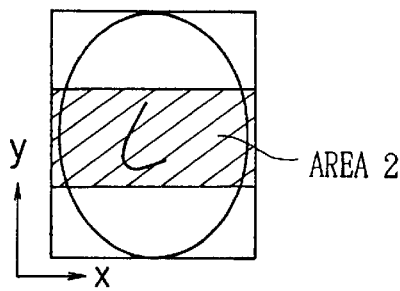
FIG. 20B
TWO PEAKS
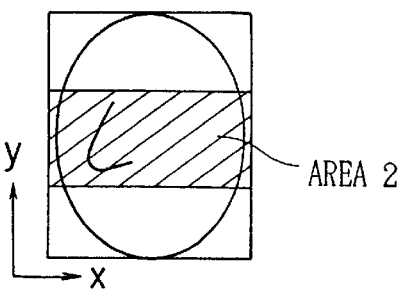
FIG. 20A-1
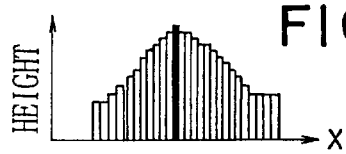
FIG. 20B-1
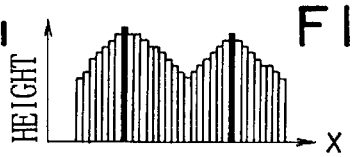
DISPERSION OF INCLINATION OF NORMAL VECTOR
DETERMINATION OF INCLINATION OF FACE
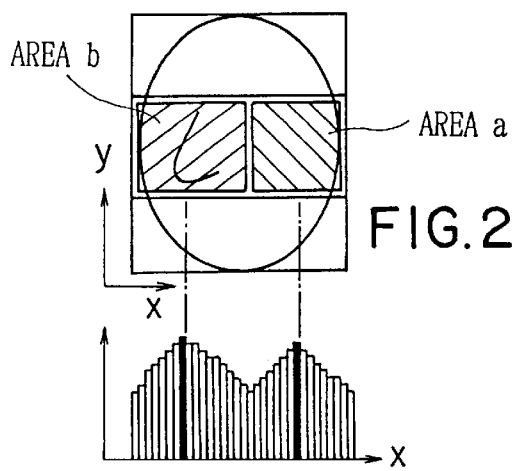
FIG. 20C
FIG. 20C-1
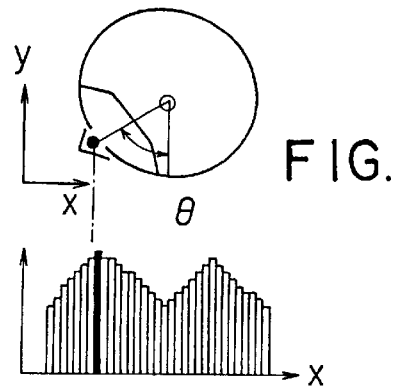
FIG. 20D
FIG. 20D-1
APPLICATION OF INERTIA EQVIVALENT ELLIPSOID
DETERMINATION OF INCLINATION OF FACE
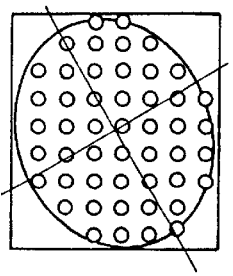
FIG. 21A
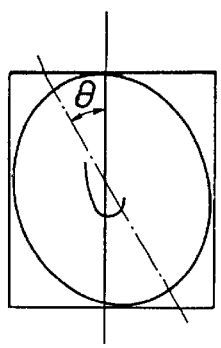
FIG. 21B

DRIVER MONITORING DEVICE

BACKGROUND OF THE INVENTION

1. Field of the Invention

The present invention relates to a driver monitoring system, and more particularly to a driver monitoring system for monitoring a driver which drives a motor vehicle in a dangerous state such as looking aside or falling into doze.

2. Field of the Invention

There have been proposed some techniques of for detecting the abnormal driving state of looking aside or falling into a doze by sensing the physiological phenomenon of a driver. These methods includes to use a living body signal and a physical reaction. The former technique observes a living body signal such as a brain wave, skin electric potential and heart beat taken out directly from the driver so that such a phenomenon may be sensed with high accuracy. This technique, however, requires to mount a sensor which is very troublesome by driver. On the other hand, the latter technique has only to observe a change in the movement of the head of a driver so that it does not require for the driver to mount the sensor. This technique, however, is problematic in improvement of accuracy because of indirect judgement of the behavior. The other technique proposed hitherto is to observe a change in the frequency of closing eyes of the driver.

However, the techniques proposed hitherto have the following disadvantages. Where the driver monitoring system is to be mounted on a motor vehicle, the system must satisfy various conditions (1) that the system is portable, (2) that the performance, reliability and safety are assured, and (3) that it does not hinder the driving of a driver.

Therefore, the system must observe the physical reaction of a driver without mounting the sensor and detect it by image processing. Further, the system must acquire the three-dimensional information of a driver's face without mounting the sensor on the driver to detect the inclination of the face of the driver so that the dangerous state of the driver such as such as looking aside or falling into doze is detected.

SUMMARY OF THE INVENTION

An object of the present invention is to provide a driver monitoring system which can assure the performance, reliability and safety of a motor vehicle and does not hinder the driving of a driver.

In order to attain the above object, there is provided a basic configuration of a driver monitoring system comprising: projecting means for projecting a pattern of bright spots on a face of a driver; pick-up means for picking up said pattern of bright spots to provide an image of the face; data processing means for processing said image, sampling the driver's face to acquire three-dimensional position data at sampling points and processing the data thus acquired to provide an inclination of the face; and decision means for deciding whether or not the driver is in a dangerous state in accordance with the inclination of the face obtained.

In the above basic configuration, in order to decide whether or not the driver is in a dangerous state, the inclination of the face of the driver is acquired using the three-dimensional position data at the sampling points of the driver's face on the basis of the pattern of bright spots projected on the driver's face. For this reason, the points of sampling may be coarse. In addition, the driver monitoring system can be installed in such a simple manner that the pattern light projecting means Z and pick-up means are set at a location where the pattern of bright spots can be projected on the driver's face and picked up.

The above basic configuration is preferably provided with means for issuing a warning to the driver when it is decided that the driver has fallen in a dangerous state. Thus, when the driver's face inclines because of falling into a doze or looking aside, a warning is issued to the driver.

In the above basic configuration, said data processing means preferably comprises storage means for storing reference data corresponding to sampling points obtained when said pattern of bright spots is projected on a reference plane behind the face of the driver, wherein movement amounts of the sampling points of the face of the driver corresponding to said sampling points of the reference data stored in said storage means are acquired and three-dimensional data of each of the sampling points is acquired on the basis of the movement amounts thus acquired. Thus, the inclination of the driver's face can be acquired.

In the above basic configuration, said data processing means processes said three-dimensional position data to acquire an inclination angle of the face of the driver in a vertical direction, and said decision means decides that the driver is in a dangerous state when the inclination angle of the face thus acquired continues at a prescribed value for a predetermined time. This detects the omen of the driver falling into dozing.

In the above basic configuration, said data processing means further processes said three-dimensional position data to acquire an inclination angle of the face of the driver in a horizontal direction, and said decision means decides that the driver is in a dangerous state when the gradient angle of the driver's face thus acquired continues at a prescribed value for a predetermined time. This detects that the driver is in a state where he is looking aside.

In the above basic configuration, said data processing means further processes said three-dimensional position data to acquire an inclination angle of the driver's face in an oblique direction, and said decision means decides that the driver is in a dangerous state when the gradient angle of the face thus acquired continues at a prescribed value for a predetermined time. This detects that the driver has shaken his face to relieve his fatigue or shoulder's stiffness.

Further, in the above basic configuration, said projecting means comprises two fiber gratings stacked orthogonally which receive light from a light source and projects a matrix of bright spots to a monitoring area using the received light. Therefore, the projecting means is simple in structure and can be easily fabricated. In addition, this projecting means is suitable to project a matrix of bright spots as the pattern of bright spots.

In the above basic configuration, said projecting means and said pick-up means are installed on a steering column. Therefore, the three-dimensional position data can be easily obtained when the driver's face is looked at from the front.

The above and other objects and features of the present invention will be more apparent from the following description taken in conjunction with the accompanying drawings.

BRIEF DESCRIPTION OF THE DRAWINGS

FIG. 8 is a flowchart showing the process of monitoring a driver;

FIG. 12 is a view showing reference data created;

FIG. 14 is a view showing a manner of extracting pixels constituting a bright spot;

FIG. 16 is a view showing direction of a driver's face;

FIGS. 17A and 17B are views showing a method of extracting the three-dimensional position data of the face;

FIG. 18 is a view showing a method of applying a circumscribed square to the face;

FIGS. 19A and 19B are views showing a method of detecting the direction of the driver's face around the X-axis;

FIGS. 20A to 20D are views showing a method of to detecting the direction of the driver's face around the Y-axis; and FIGS. 21A and 21B are views showing a method of detecting the direction of the driver's face around the Z-axis.

DESCRIPTION OF THE PREFERRED EMBODIMENTS

Figure 1:
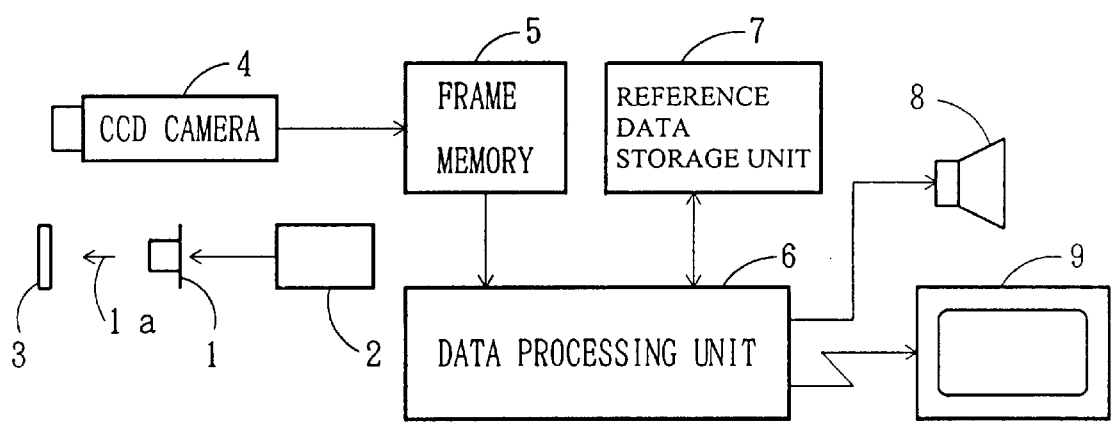
FIG. 1 is a block diagram showing one embodiment of the driver monitoring system according to the present invention.

Now referring to the drawings, an explanation will be given of various embodiments of the present invention. FIG. 1 is a block diagram showing an embodiment of the driver monitoring system according to the present invention. In FIG. 1, the driver monitoring system comprises a laser light source 1, a driving device 2 for driving the laser light source 1, and a pattern light projecting element 3 for receiving a laser beam 1a from the laser light source 1 and projecting a pattern of bright spots, e.g. a matrix of bright spots on a monitoring area by the input laser beam 1a. The laser light source 1, driver 2 and pattern light projecting element 3 constitute a projecting means Z for projecting the pattern of bright spots on the driver's face.

As shown from FIG. 1, the driver monitoring system includes a CCD camera 4 serving as an image pick-up means for picking up the pattern of bright spots projected on the face of a driver, a frame memory 5 for temporarily storing the image signal obtained from the CCD camera 4, a data processing unit 6 which is a computer operated in accordance with a prescribed program, a reference data storage unit 7 for previously storing the image data of the matrix of bright spots obtained when projected on a screen located at a predetermined position, a sounding means 8 such as a buzzer for generating sound warning a driver of a danger and a speaker for generating warning message, and a display 9 for displaying warning for the driver.

Figure 2A:
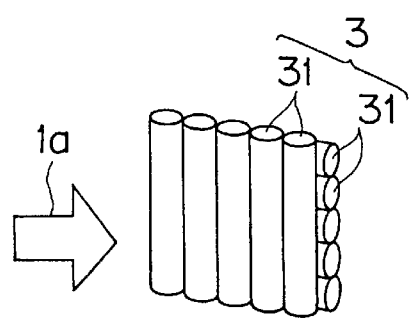
FIGS. 2A and 2B are views showing FG's and a matrix of bright spots, respectively.
Figure 2B:
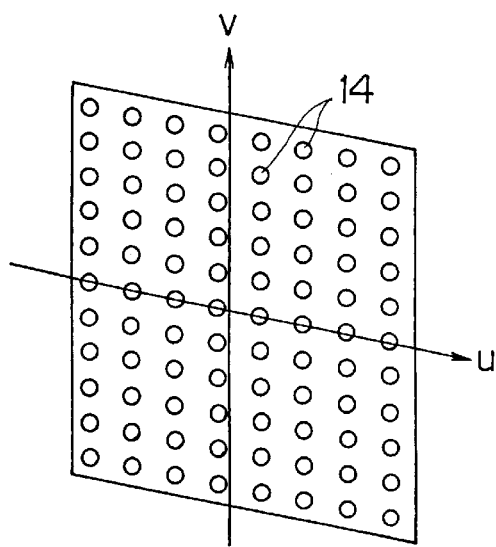
Figure 3:
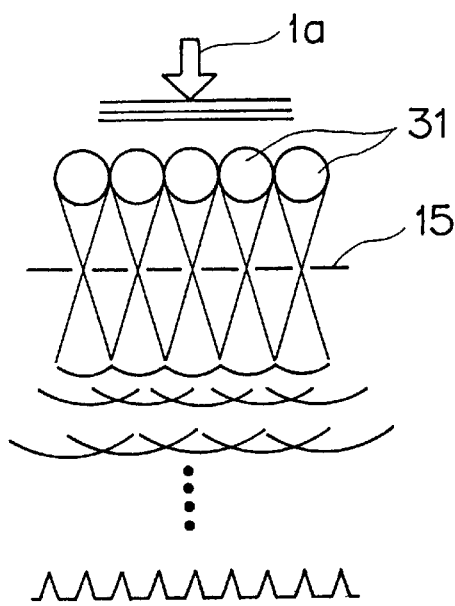
FIG. 3 is a diffraction pattern produced when laser light is incident on the FG's.

The pattern light projecting element 3, as shown in FIG. 3A, includes two groups of fiber gratings 31 (FG's) arranged in parallel and stacked perpendicularly to each other. Each of the FG's 31 is a phase distribution type of diffraction grating composed of 100 optical fibers, each having a diameter of 20 μm to 50 μm, arranged in a sheet. As shown in FIG. 3A, when a laser beam 1a is vertically incident on the FG's 31, each of the fibers constituting the FG serves as a cylindrical lens so that the laser beam 1a is converged into the focal point of the fiber to form many spherical waves which interfere each other to spread. As a result, bright spots are projected at regular intervals on a projecting plane to form a diffraction pattern. Additionally, where the FG's are stacked perpendicularly to each other, as shown in FIG. 2B, a matrix of bright spots 14 having a tetragonal lattice shape is projected on a projecting plane behind the FG's. The FG has advantages that (1) it can be easily fabricated because of its simple configuration, (2) it can be regarded as being a slit column having a minute width, and (3) it can be conveniently used as a projecting element for projecting a matrix of bright spots on an observation area since the distribution of diffraction light is uniform at a high order.

Figure 4A:
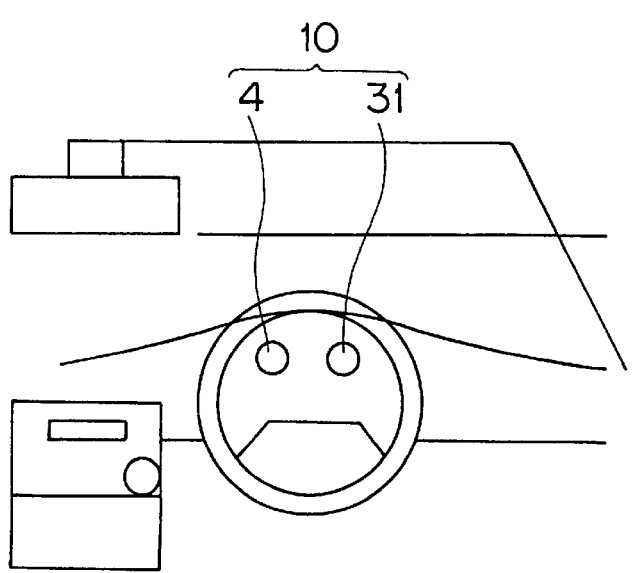
FIGS. 4A and 4B are a front view of a state of installing a visual sensor on the steering column of a motor vehicle and a side view thereof, respectively.
Figure 4B:
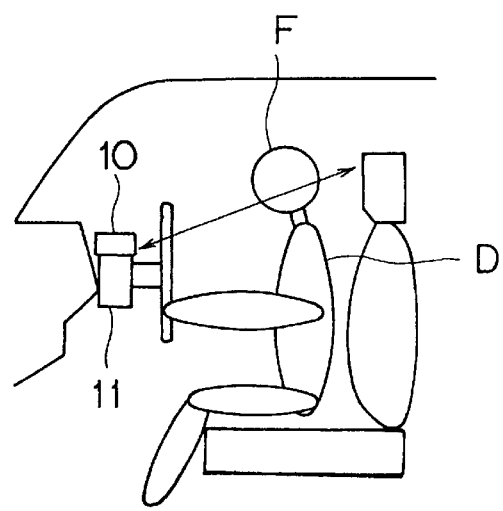

FG's 31 and the CCD camera 4 are integrated to form a visual sensor unit 10. As shown in FIGS. 4A and 4B, the sensor unit 10, which is installed on a steering column 11 of a motor vehicle, effects three-dimensional positional measurement when the face F of a driver is seen from the front. However, the sensor unit 10 may be located not only on the steering column 11 but also on the other position where the three dimensional position of the face can be easily detected.

In operation, the matrix of bright spots 14 projected on the monitoring area by the pattern light projecting element 3 is picked up by the CCD camera 4. The image signal acquired by the CCD camera 4 is temporarily stored in the frame memory 5, and captured by the data processing unit 6. The data processing unit 6 compares the image data obtained by the frame memory 5 with the reference data previously stored in the reference data storage unit 7 to the movement amount of the bright spots on the image plane of the CCD camera 4.

Figure 5:
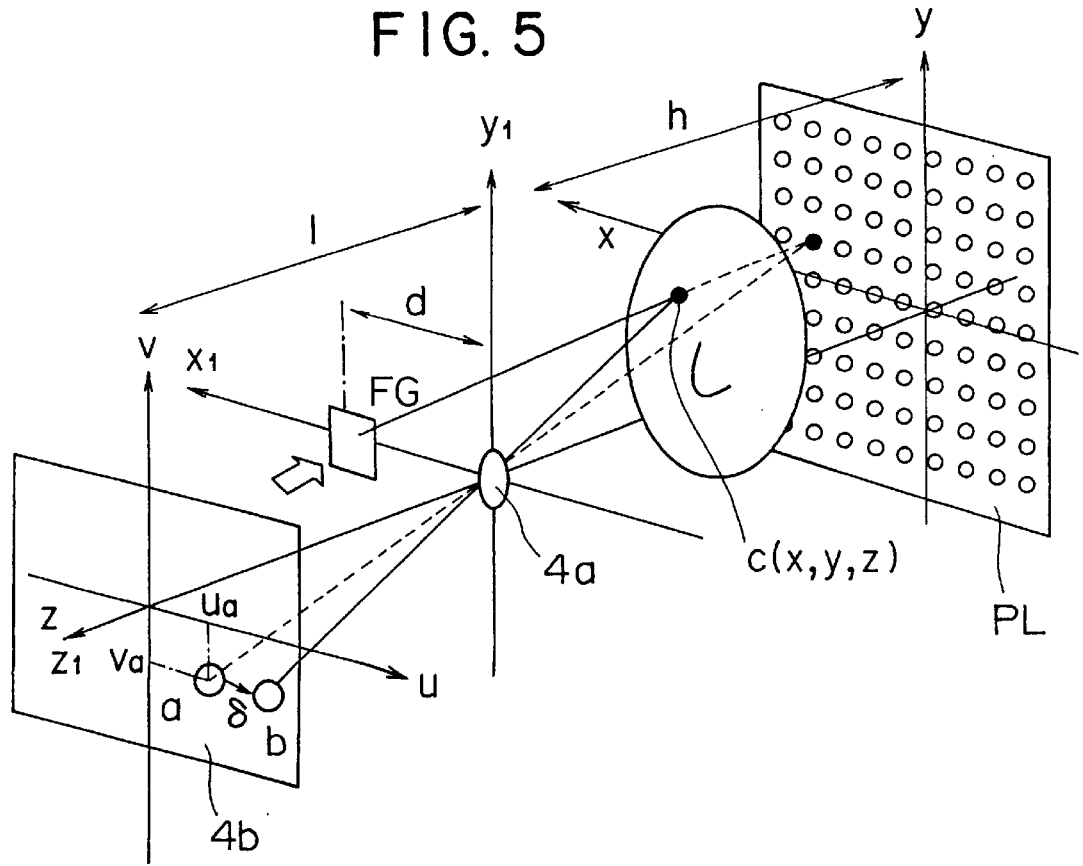
FIG. 5 is a schematic view of the optical arrangement of a visual sensor.

The optical arrangement of the driver monitoring system is shown in FIG. 5. In a coordinate system (x1, y1, z1) having an origin of the lens 4a of the CCD camera 4, the FG's and the image plane 4b of the CCD camera 4 are arranged at points (0, d, 0) and (0, 0, 1), respectively. In this optical arrangement, when the bright spots are projected onto the face in order to acquire the three-dimensional data of the face, as indicated by a and b in FIG. 5, the bright spot moves in a certain direction. In this case, the three dimensional spot (x, y, z) of the bright spot can be obtained by the following equations (1) to (3) in a coordinate system (x, y, z) having an origin on a reference plane PL using a movement amount of the bright spot on the image plane 4b.

A spot a on a u-v coordinate in an image plane 4b results when a bright spot is projected on a reference plane PL, and hence, the coordinate (Ua, Va) is a reference data. A spot b results when the bright spot is projected on the face of a driver, i.e., shifted from the spot a by distance δ.

$$z = \frac{h^2 \delta}{dl + h\delta} \tag{1}$$

-continued $$x = \frac{ua+\delta}{l}(h-z) \quad (2)$$

$$y = \frac{va}{l}(h-z) \quad (3)$$

where h represents the distance from the reference plane PL to the lens 4a; d represents the center-to-center distance between the lens 4a and the image plane 4b; distance between the lens 4a and the image plane 4b.

The three dimensional information acquired by the FG is the height of the bright spot to be calculated on the basis of the movement of each bright spot projected by the FG from the reference position (position when the face is not located within an observation). Therefore, it is necessary to acquire the position of each bright spot on the image plane 4b. Since each bright spot on the image plane 4b has a size of several pixels, its position is expressed in terms of the center of gravity.

Figure 6A:
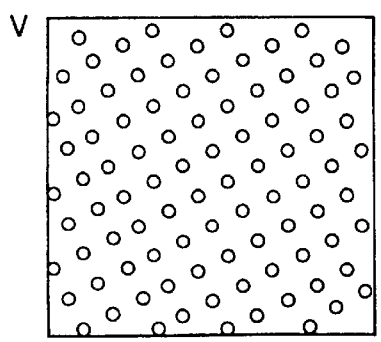
FIGS. 6A to 6C are views for explaining the theory of acquiring the three dimensional position data of a driver's face.
Figure 6B:
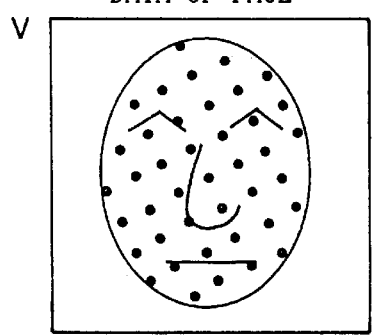
Figure 6C:
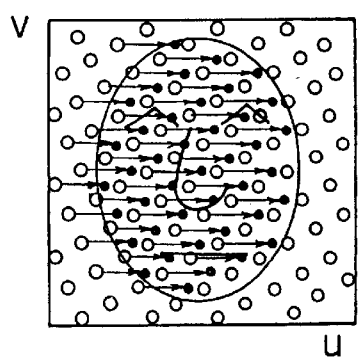
Figure 9:
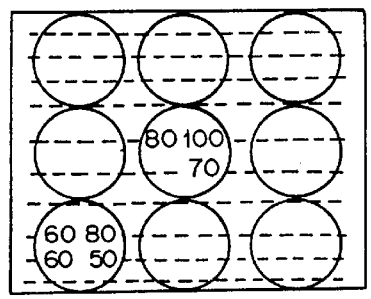
FIG. 9 is a view showing pixel data of bright spots obtained in the processing of extracting bright spots.

The movement amount of the bright spot means the distance from the corresponding bright spot when it is projected on the reference plane PL. Therefore, as shown in FIGS. 6A to 6C, on the basis of the reference plane data (a) as the reference data corresponding to the bright spots on the reference plane PL and the face data corresponding to the bright spots on the face of a driver, the movement amount of the bright spots (c) can be acquired. Hereinafter the spots whose movement amounts are measured will be referred to as moving spots. The image of bright spots projected on the reference plane will be referred to as a reference plane image, and the spots in the image will be referred to as reference spots. Their positions are expressed as (ui, vi) where i is the number of each bright spot numbered previously on the reference plane image.

The data processing unit 6 calculates the movements δ from the reference spot and thereafter calculates the three dimensional coordinate position (x, y, z) of the face using these δ's. For convenience of the subsequent processing, the three dimensional data thus acquired are re-sampled by linear interpolation so that sampling points are arranged in a square lattice. The data processing unit 6 detects the present inclination of a driver using the three-dimensional information of the face to decides the dangerous degree of the driver, thereby giving a warning.

Figure 7:
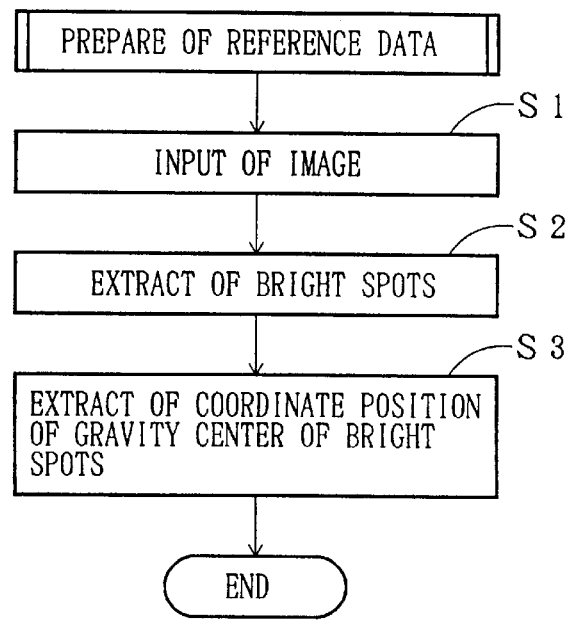
FIG. 7 is a flowchart showing the processing for creating reference data.

The processing in the data processing unit 6 as described above includes forming of reference data and monitoring of the driver as shown in FIGS. 7 and 8.

First, referring to the flowchart of FIG. 8, an explanation will be given of the processing of forming reference data. In step S1, a pattern of bright spots projected on a screen in a state where a driver is absent is picked up by the CCD camera 4. The image signal in a matrix of bright spots thus acquired is converted into pixel data of, e.g., 512×512 pixels and luminances of 0 to 255 degrees. These data are temporarily stored in a frame memory. In step S2, bright spots are extracted from the pixel data temporarily stored in the frame memory 5. In step S3, the coordinate positions of the gravities of bright spots are determined and stored in the reference data storage unit 7.

Figure 10:
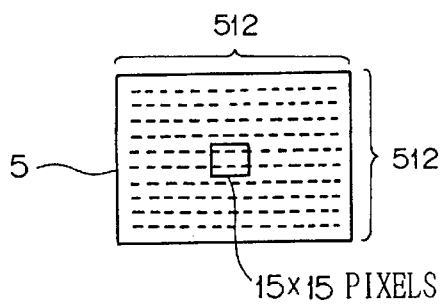
FIG. 10 is a view of pixel data in a frame memory.

In the extraction of the bright spots in step S2, it is decided whether or not the tone value of each of the pixel data in the frame memory 5 is larger than a prescribed threshold value. If it is larger than the prescribed threshold value, the pixel having such a value is taken. If not, it is made zero. Such processing is repeated for each of all the pixels. Thus, a lump of pixels as shown in FIG. 10 is taken out.

Additionally, where the bright spots cannot be extracted with a fixed threshold value since there is a large difference in luminance between the bright spots, the average value of the luminance within a window of m×n pixels around a certain pixel. This average value is used as a threshold value to decide whether or not the pixel at issue should be taken. Likewise, the same processing is carried out for other pixels.

Figure 11:
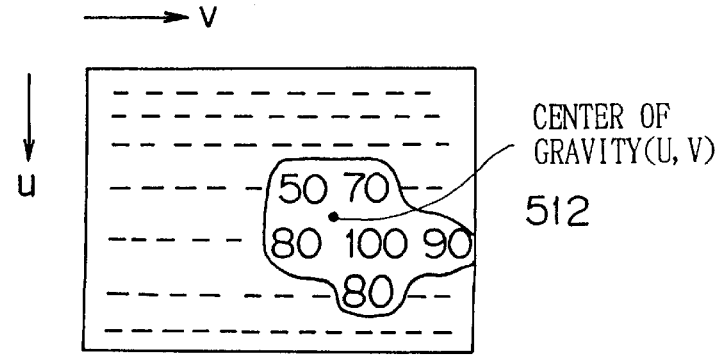
FIG. 11 is a view for explaining the method of acquiring a center of gravity of the bright spot.

An explanation will be given of the process of determining the coordinate position of the center of gravity of the bright spot. In the determining processing, the gravity coordinate (U, V) of the bright spot as shown in FIG. 11 is acquired on the basis of the weighted center of gravity position of pixels in each of the bright spots. By the above processing, as shown in FIG. 12, the final reference bright spot data (reference data) of bright spot gravity coordinate for each of the bright spots are acquired and stored in the reference data storage unit 7. The data processing unit 6 serves as means for creating the reference data including each of the bright spots from the image data of the image signals from the CCD camera 4 having picked up the pattern of bright spots projected on the screen which is a reference plane PL.

Incidentally, in the embodiment described above, the sensor unit 10 was located on a steering column and the screen was set in the vicinity of the headrest of the driver. However, the sensor is not required to collect the reference data as long as it is in an geographically similar state.

Referring to FIG. 8, an explanation will be given of the driver monitoring processing. First, in step S11, the reference data are captured from the reference data storage unit 7. In step S12, the pattern of bright spots is projected on the face of the driver and picked up by the CCD camera. The image signal in a matrix of bright spots thus acquired is converted into pixel data of, e.g., 512×512 pixels and luminances of 0 to 255 degrees. These data are temporarily stored in a frame memory 5. In step S13, from the pixel data temporarily stored in the frame memory 5, the moving bright spots are extracted and their moving amounts are calculated. In step S14, the three-dimensional coordinate positions thereof are calculated. In step S15, on the basis of the three-dimensional coordinates thus acquired, the three-dimensional coordinate position of each of points in the square lattice of bright spots is computed, i.e., "re-sampling" is carried out.

In step S16, the three-dimensional coordinate data of the face are extracted. In step S17, a circumscribed square is applied to the three dimensional coordinate data of the face extracted in step S18. In step S18, the front-rear, left-right and inclination of the square are completed. In step S19, it is decided whether or not the driver is in a dangerous state. If the answer is "NO", the processing process is returned to step S12 to repeat the above processing. If the answer is "YES", in step S20, the driver is noticed of a warning through a sounding means 8 or display 9. Thus, the processing process is returned to step S12. As apparent from the flowchart of FIG. 8, the data processing unit 6 serves as a data processing means 61 for processing the image picked up by the CCD camera 4 to sample the face of the driver, acquire the three-dimensional position data of each of sampling points and process the three-dimensional data thus acquired to acquire the inclination of the face of the driver, and also serves as a detecting means 62 for deciding whether or not the driver is in a dangerous state on the basis of the inclination of the face acquired.

A more specific explanation will be given of the processing of extracting the moving bright spot and computing the moving amount in step S13 and the computing the three-dimensional coordinate of the moving bright spot.

Processing No. 1

Figure 13A:
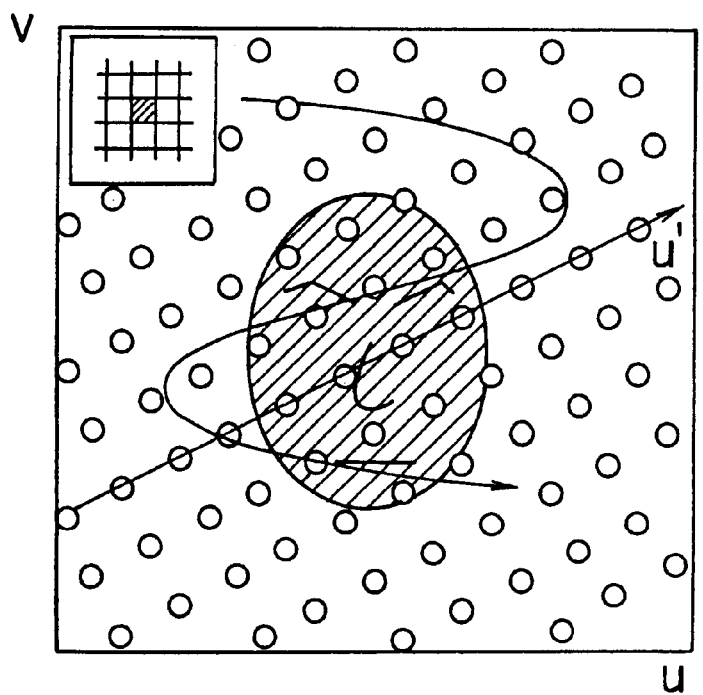
FIGS. 13A to 13C are views showing a manner of processing a floating threshold value.
Figure 13B:
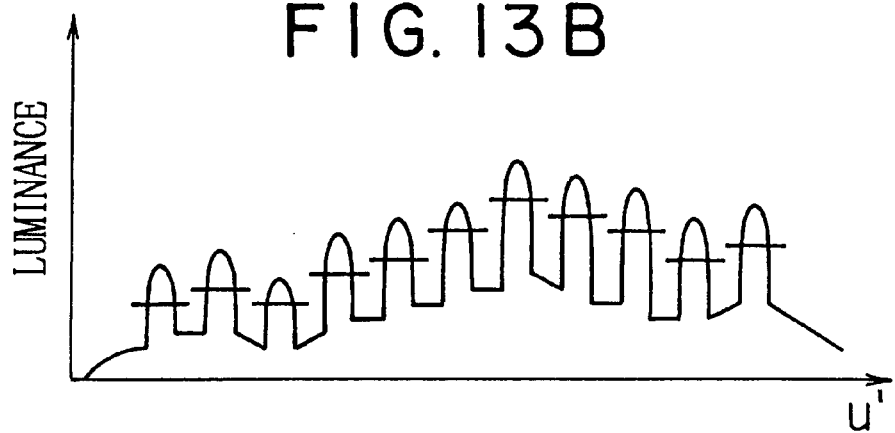
Figure 13C:
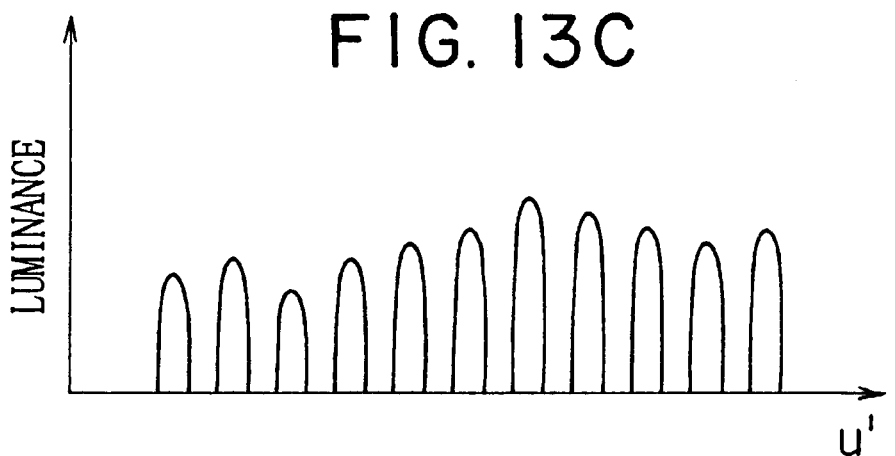

The pixels within a bright spot will be extracted from the projected image of bright spots. However, the luminance of the bright spot projected on the face differs with the respective positions, e.g., bright at cheek, dark on the sides of nose. The processing using a single threshold value makes it difficult to extract the pixels within the bright spot. Therefore, the bright spots on a single scanning line of the bright spot projected image within a monitoring area as shown in FIG. 13A are to be extracted in comparison with a threshold value, the threshold value processing is carried out without fixing the threshold value and taking the pixels around a pixel at issue into consideration, as shown in FIG. 13B. Thus, the luminance values of the pixels other than the pixels in the bright spots are set for zero as shown in FIG. 13C. For example, the average luminance in 15×15 pixels in the neighborhood of the pixel at issue. On the basis of the average value thus obtained, the threshold value processing is carried out for the pixel at issue.

Processing No. 2

When the luminance B (uj, vj) of the pixel at the coordinate (uj, vj) is zero, processing No. 3 will be effected. If not, processing No. 4 will be executed. The luminance B (uj, vj) of zero means that the bright spot is greatly shifted from the coordinate value (uj, vj). In processing No. 3, the shifted bright spot will be extracted.

Processing No. 3

As shown in FIG. 14, the moving range (square bold frame) of a reference spot i on an image plane 4b is scanned to detect the position of the pixel having luminance being not zero.

Processing No. 4

As regards the pixels Ij having luminance being not zero within a moving area of the bright spot i, the sum SUM-u and SUM-v of the primary-order moment of u and v and zero-order moment SU-b will be acquired.

$$\text{SUM-}u = \Sigma(uB(u, v)) \quad (4)$$

$$\text{SUM-}u = \Sigma(vB(u, v)) \quad (5)$$

$$\text{SUM-}B = \Sigma B(u, v)) \quad (6)$$

Processing No. 5

The position gi (u'i, v'i) of the gravity of the bright spot can be acquired by Equation 7.

$$u'i = \frac{SUM\text{-}u}{SUM\text{-}B}, v' = \frac{SUM\text{-}v}{SUM\text{-}B} \quad (7)$$

Processing No. 6

The moving amount δi of a bright spot i can be acquired by Equation 8.

$$\delta i = [(ui - u'i)^2 + (vi - v'i)^2]^{1/2} \quad (8)$$

where (ui–vi) represents the coordinate of bright spot i on a reference image and (u'i, v'i) represents the coordinate of the bright spot in measurement.

Incidentally, in the geometrical arrangement shown in FIG. 5, the bright spot moves only in a direction of u. However, its movement in a v direction which may be generated owing to lens aberration is acquired from Equation (8) anyway. Therefore, the amount of movement in only the direction of u may be adopted as the amount of movement of the bright spot.

Processing No. 7

For all the bright spots on the input bright to spot projected image, the above processing will be performed. This processing provides the amount of δ from the reference spot. Using δ, the three-dimensional coordinate (x, y, z) of a driver's face can be calculated.

Thus, it can be seen that the projected image of bright spots obtained by the technique for projecting a pattern of bright spots has been roughly sampled by the matrix of bright spots, and pixels constituting each bright spot cannot be detected through simple threshold-value processing because their luminances differ at different positions. The visual sensor 10 can provide the three-dimensional data from the one sheet of the projected image of bright spots without mechanical scanning.

The gravitational image of the bright spot can be acquired by extracting the pixels constituting the bright spot though the floating threshold value processing of the luminance spot projected image.

Figure 15A:
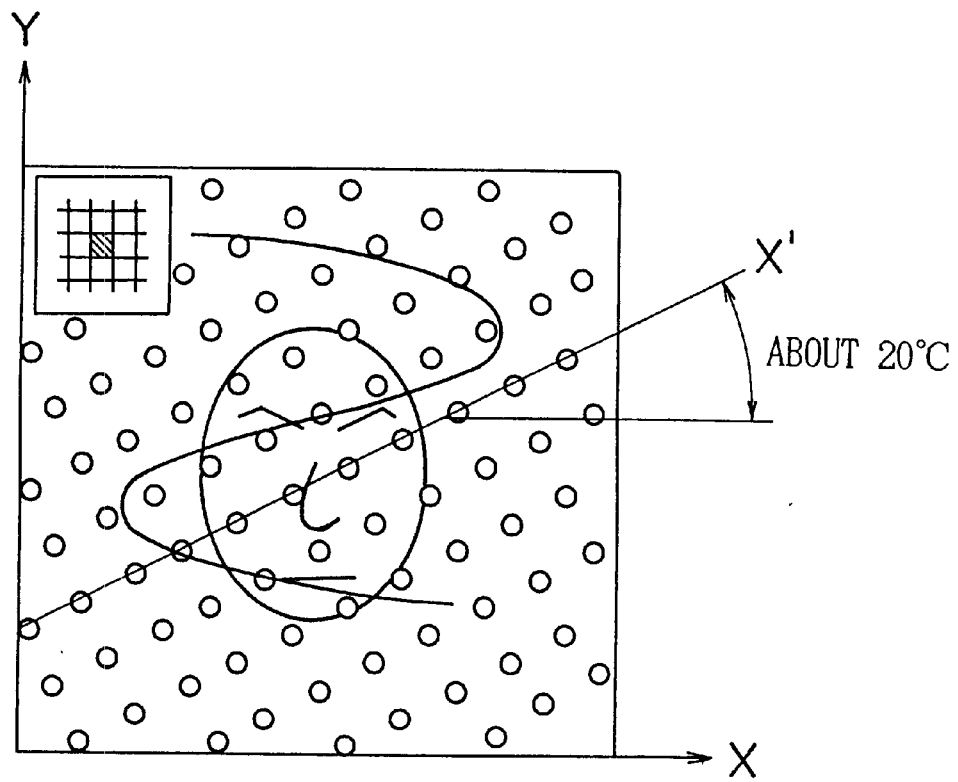
FIGS. 15A and 15B are views showing a method of resampling.
Figure 15B:
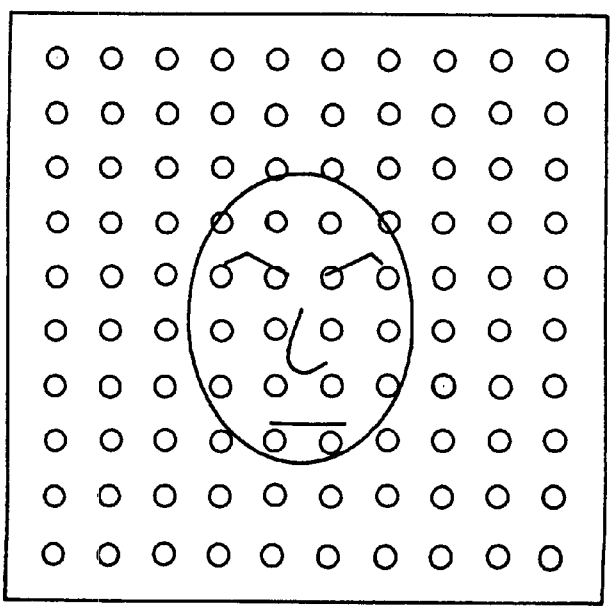

Meanwhile, the re-sampling in step S15 is required when the sampled points of the three-dimensional data acquired by the visual sensor 10 are inclined from the X-axis as shown in FIG. 15(A) (rotation of about 20° in the example of FIG. 15A) in accordance with the location of the FG's 31 and the CCD camera 4 relative to the face. In this case, since there is no sampling points in parallel to the X-axis, in order to simplify the subsequent processing, re-sampling is performed using the measurement data so that the sampled points are arranged on a tetragonal lattice in an X-Y plane as shown in FIG. 15B. The processing of re-sampling can be carried out by linear interpolation.

The three-dimensional data thus obtained represent the generous shape of the face such as the shape of nose. Although the visual sensor 10 gives reduced space resolution because of rough sampling of the space, it can acquire the distance data at high speed with no mechanical scanning by scanning the movable range of the bright spots of a sheet of the bright spot projected image.

Using the three-dimensional information of the face acquired by the visual sensor 10, the steps S16 to S18 will be carried out concretely in order to the detect the direction of the driver's face.

Meanwhile, the direction of a human face can be represented by the following three coordinates, as shown in FIG. 16:

1. direction of a line connecting right and left ears (X-coordinate)
2. direction of a line connecting a chin to the top of a head (Y-coordinate)
3. direction of a line connecting the back part of the head to the apex of a nose (Z-coordinate)

Therefore, by detecting the direction of the face regarding the above three directions, the a present direction of the driver's face can be detected.

The three dimensional data acquired by the visual sensor 10 includes not only the three dimensional data of the face but also other data such as the shoulder of the driver and the seat of the vehicle. In order to detect the direction of the driver's face, such three-dimensional information other than the face is not required. Therefore, it is necessary to extract only the information on the face from the three dimensional data thus acquired. An explanation will be given of a concrete method of extracting only the information on the face in step S16.

Consideration is given to the shape of a human's face. The generous portion such as the cheek and forehead on the human's face slopes gradually. On the other hand, the lower side of the chin or neck slope slightly greatly. Therefore, consideration is given to the slopes of the normal vectors at the respective points of the three dimensional data acquired by re-sampling (three-dimensional data of the respective lattice points of a tetragonal lattice). The slope of the normal vector refers to an angle formed by the normal vector of each lattice point and a reference plane PL, which is the largest (90°) when the normal vector represents the z-axis direction. The portion with the gentle slope such as a cheek or forehead has a large gradient of the normal vector whereas the portion such as the chin's lower side or neck has a small gradient of the normal vector.

Therefore, the portion having the large normal vector of the three-dimensional data acquired is first extracted. The result is shown in FIG. 17A. The respective projections in the X-direction and Y-direction are taken. In the projection, the Z value on the (x, y, z) coordinate at the lattice points accumulated in the X-direction and Y-direction is computed. For example, the accumulation of the Z values of the lattice points arranged in a column represents one value of the projection in the Y-direction. The accumulated value in the other column is also computed to acquire the Y-direction projection as shown in FIG. 17B. Likewise, the same processing is carried out for the X-direction projection. As a result, as shown in FIG. 17B, by the processing of the threshold value using the projection, the three dimensional data which are not necessary such as the data on a neck or shoulder are removed to extract the three-dimensional coordinate data.

The three-dimensional data thus extracted are information on the driver's face. The circumscribed square is adapted to the three dimensional coordinate data of the face extracted in step S17. In order to compute the slope in step S18, the circumscribed square is divided into three areas as shown in FIG. 18. The center area is set so that the driver's nose falls within it. It has a length of, e.g., 8 cm in a longitudinal direction. The three areas are referred to as area 1, area 2 and area 3 from top.

An explanation will be given of a concrete method of detecting the direction of the driver's face around the X-axis (vertical direction) in step S18. Now, as shown in FIG. 19A, attention is paid to the heights of the areas 1 and 3 of the circumscribed square. For example, when the driver's face inclines forward, the state as shown in FIG. 19B results. In this case, the forehead, i.e., area 1 becomes higher than in a normal state. The chin, i.e. area 3 becomes lower than in the normal state. Thus, when the driver's face inclines forward or back, the heights of the area 1 and area 3 of the circumscribed square vary. Paying attention to the average value of each of the heights of the areas 1 and 3, the angle θ formed by the vector connecting the average values of the heights of the areas and the Y-axis is determined as the gradient of the driver's face around the X-axis. Thus, when the driver inclines forward or back, changes in the gradient from the initial state (normal state) to the forward or back can be acquired.

An explanation will be given of a typical concrete method of acquiring the gradient of the driver's face around the Y-axis. Now, attention is paid to the area 2 of the circumscribed square. Since the nose portion falls in the area 2, if the projection of the area 2 in the Y-axis direction is taken, the portion corresponding to the nose becomes highest as shown in FIG. 20A. The highest position represents the generous position of the nose so that the position of the nose can be detected as the gradient of the driver's face around the Y-axis (horizontal direction). When the driver's face turns side greatly, however, there are two peaks in the projection as shown in FIG. 20B. This is because the portion of the cheek moves forwards so that the integrated value of its height in the Y-axis direction becomes higher than that including the nose. In this way, because of the two peaks, there are two cases where the nose portion is selected correctly, and the cheek portion is selected erroneously. Accordingly, the gradient of the driver's face cannot be detected correctly.

In order to obviate such a disadvantage, when plural peaks appear, small zones around the peaks are taken as shown in FIG. 20C. These small zones are referred to as zones a and b. The nose portion falls within either of the areas. The area corresponding to the nose portion provides a great change in the gradient because of unevenness of the nose, whereas the area corresponding to the cheek provides a gentle gradient. For this reason, attention is paid to the dispersion in the gradient of the normal vector of each zone (zones a and b). As described above, in the area incorporating the nose, where there is a variation in the normal vector because of a large change in the gradient, the dispersion of the gradient of the normal vector is large. On the other hand, in the area incorporating the cheek portion, where there is little variation in the normal vector because of its gentle gradient, the dispersion of the gradient of the normal vector is small. Therefore, the dispersions of the gradients of the normal vectors in both zones a and b are compared with each other. The peak included in the zone having the larger dispersion is taken to detect a correct peak position.

As seen from FIG. 20D which is viewed from top, the angle θ of the vector connecting the detected nose position to the center of gravity of the head is determined as the gradient of the driver's face around the Y-axis (horizontal direction). Thus, when the driver takes his eyes off the road because of being captivated by the outer appearance or chatting with a person in a passenger seat, a change in the direction of the driver's face around the Y-axis from the initial state (normal state) can be detected. It is assumed that the rotary shaft is fixed since its center moves according to the difference among individuals or the situation.

An explanation will be given of a concrete method of detecting the direction of the driver's face around the Z-axis in step S18. Assuming that the shape of the driver's face is substantially elliptical, an inertia equivalent ellipse is applied to points having the heights in the circumscribed square as shown in FIG. 21A. Further, as shown in FIG. 22A, the gradient of the longitudinal axis of the ellipsoid is taken as the gradient. The inertia equivalent ellipse refers to an ellipse having an inertia main axis of a group of particles existing in a two-dimensional plane as a longitudinal axis and having equivalent inertia moments about the inertia main axis. An explanation will be given of the method of acquiring the gradient of the longitudinal axis of the inertia equivalent ellipse.

1. With respect to the coordinate (u, v) on the image plane of point having a height, 0-th order moment m00, the first order moments m01, m10, and the second order moments m20, m11 and m02 will be acquired as follows.

$$m00 = \Sigma g(u, v) \tag{9}$$

$$m10 = \Sigma u g(u, v) \tag{10}$$

$$m01 = \Sigma v g(u, v) \tag{11}$$

$$m20 = \Sigma u^2 g(u, g) \tag{12}$$

$$m11 = \Sigma u v g(u, v) \tag{13}$$

$$m02 = \Sigma v^2 g(u, v) \tag{14}$$

2. The center of gravity (Ug, Vb) of a group of points having heights can be acquired.

$$Ug = \frac{m10}{m00}, \quad Vg = \frac{m01}{m00} \qquad (15)$$

3. The gradient θ of the inertia main axis can be acquired by $$\theta = \frac{(M02 - M20) + [(M02 - M20)^2 + 4M11^2]^{1/2}}{2M11} \qquad (16)$$

Where M20, M11 and M02 represent the second order moments around the center of gravity G.

M20, M11 and M02 can be acquired by $$M20 = \frac{m20 - m10^2}{m00} \qquad (17)$$

$$M11 = \frac{m11 - m10m01}{m00} \qquad (18)$$

$$M02 = \frac{m02 - m01^2}{m00} \qquad (19)$$

The gradient θ of the inertia main axis thus acquired is determined as the driver's face around the Z-axis. In this way, the direction of the driver's face when the driver shakes his face to relax fatigue or his stiff neck.

Through the processing described above, the present direction of the driver's face can be detected. An explanation will be given of a method of deciding whether or not the driver is in a dangerous state in step S19.

When the driver takes his eyes off the road, the detected direction of the driver's face around the Y-axis (horizontal) varies greatly. But, since this direction varies also when the driver carefully look left and right, the detected large angle does not directly mean the dangerous state. In view of this, the state of the driver is decided using the information on the driver's direction detected in a previous frame. When the detected angle is larger than the threshold value over several frames, it is decided that the driver is in a dangerous state. Now, it is assumed that the threshold value is set at e.g., 7°. It seems that looking aside for two seconds or longer is very dangerous while the driver drives a car on a speed way. Therefore, it is decided that when the detected angle exceeding the threshold value succeeds for two or more seconds, the driver is in a dangerous state.

Meanwhile, it is well known that when the driver is in a dozing state, the tension of his muscle is reduced and the mitral muscle supporting the head relaxes. Accordingly, the driver's face leans forward or back. Therefore, it is decided that the driver is in a dangerous state when the state where the gradient of the driver's face exceeding the threshold value around the X-axis (vertical) succeeds for two or more seconds (The threshold value is set at ±7 degree).

Finally, the state where the gradient of the driver's face detected around the Z-axis is large continues for a relatively long means that the driver drives a car with his face leaned. Then, it is decided that the driver is in a dangerous state. In this case, the threshold value is set at e.g. ±15°. When the state where the gradient of the driver's face exceeding threshold value continues for two seconds or longer, it is decided that he is in a dangerous state. It should be noted that the gradient angle and time are not limited to the above values described above.

In the embodiment described above, although the pattern of bright spots was illuminated with a laser beam, it may be illuminated with infrared rays.

Although the monitoring result of the driver was used to issue warning for the driver falling in a doze or looking aside, but it may be used for control other than the warning.

In the embodiments described above, the sensor unit 10, the sensor unit 10 was installed on the steering column, it may be installed on a room mirror, a fender mirror, a roof, a dash board, an A-pillar portion (pillar portion on both sides of a windshield).

What is claimed is:

1. A driver monitoring system comprising:

projecting means for projecting a pattern of bright spots on a face of a driver;

pick-up means for picking up said pattern of bright spots to provide an image of the face;

data processing means for processing said image, sampling the driver's face to acquire three-dimensional position data at sampling points and processing the data thus acquired to provide an inclination of the face; and decision means for deciding whether or not the driver is in a dangerous state in accordance with the inclination of the face obtained.

2. A driver monitoring system according to claim 1, further comprising:

means for issuing warning for the driver when it is decided that the driver has fallen in a dangerous state.

3. A driver monitoring system according to claim 1, wherein said data processing means comprises storage means for storing reference data corresponding to sampling points obtained when said pattern of bright spots is projected on a reference plane behind the face of the driver, wherein movement amounts of the sampling points of the face of the driver corresponding to said sampling points of the reference data stored in said storage means are acquired and three-dimensional data of each of the sampling points is acquired on the basis of the movement amounts thus acquired.

4. A driver monitoring system according to claim 1, wherein said data processing means processes said three-dimensional position data to acquire an inclination angle of the face of the driver in a vertical direction, and said decision means decides that the driver is in a dangerous state when the gradient angle of the face thus acquired continues at a prescribed value for a predetermined time.

5. A driver monitoring system according to claim 1, wherein said data processing means processes said three-dimensional position data to acquire a gradient angle of the face of the driver in a horizontal direction, and said decision means decides that the driver is in a dangerous state when the gradient angle of the face thus acquired continues at a prescribed value for a predetermined time.

6. A driver monitoring system according to claim 1, wherein said data processing means processes said three-dimensional position data to acquire a gradient angle of the face of the driver in an oblique direction, and said decision means decides that the driver is in a dangerous state when the gradient angle of the face thus acquired continues at a prescribed value for a predetermined time.

7. A driver monitoring system according to claim 1, wherein said projecting means comprises two fiber gratings stacked orthogonally which receive light from a light source and projects a matrix of bright spots to a monitoring area using the received light.

8. A driver monitoring system according to claim 1, wherein said projecting means and said pick-up means are installed on a steering column.

9. A driver monitoring system according to claim 7, wherein said pattern of bright spots is in a matrix of the bright spots.

* * * * *